United States Patent Office 2,924,434
Patented Feb. 9, 1960

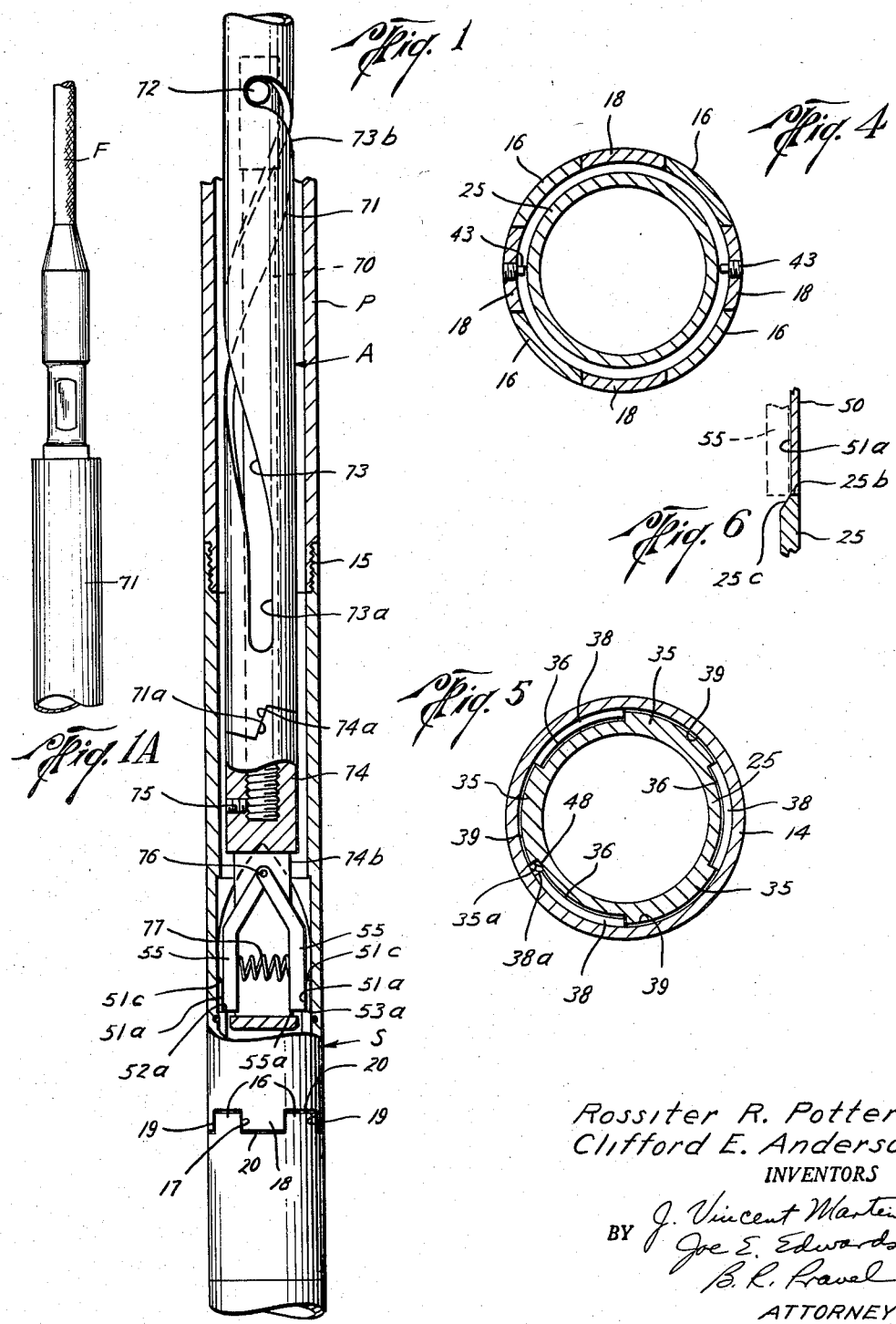

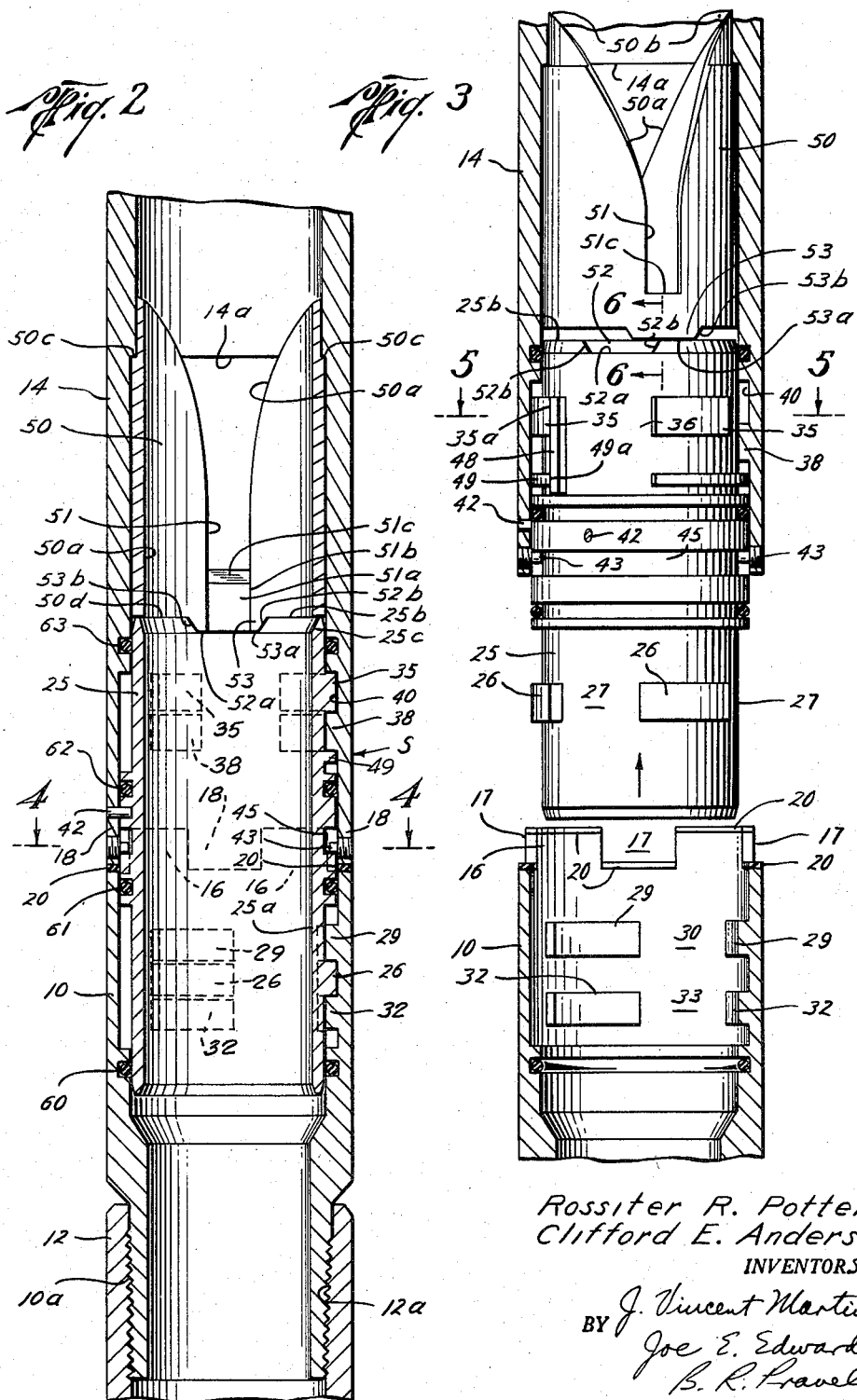

2,924,434

SAFETY JOINTS

Rossiter R. Potter, Harrisburg, Pa., and Clifford E. Anderson, Houston, Tex., assignors, by direct and mesne assignments, of one-half to M. M. Kinley Co., Houston, Tex., and one-half to John C. Kinley Application August 1, 1955, Serial No. 525,605

19 Claims. (Cl. 255—28)

This invention relates to new and useful improvements in safety joints.

In the copending U.S. patent application of Myron M. Kinley et al., Serial No. 473,274, filed December 6, 1954, a safety joint is disclosed which is adapted to be operated from the surface of the well by a tool on a wire line or other support.

An object of this invention is to provide a new and improved safety joint having all of the advantages of the safety joint of the aforesaid patent application, and in addition thereto, having a smaller outside diameter than the safety joint of said application while still providing substantially the same strength at the joint as in the pipe or tubing in which the joint is mounted.

An important object of this invention is to provide a new and improved safety joint having all the advantages of the safety joint of the aforesaid patent application, and in addition thereto, having a construction which provides for a more positive release of the joint when such release is desired.

Another object of this invention is to provide a new and improved safety joint operable by a tool on a flexible line or support wherein such joint has a new and improved means for indicating to the operator at the surface of the well that the joint has been released.

Another object of this invention is to provide a new and improved safety joint which is releasable by a rotary jarring impact imparted from an actuating tool releasably attached thereto.

The construction designed to carry out the invention will be hereinafter described, together with other features thereof. The invention will be more readily understood from a reading of the following specification and by reference to the accompanying drawings forming a part thereof, wherein an example of the invention is shown, and wherein:

Figure 1 is a view, partly in elevation and partly in section, illustrating the safety joint of this invention disposed in a well pipe, along with an actuating tool for releasing same.

Figure 1A is an elevation illustrating the upper end of the actuating tool of Figure 1.

Figure 2 is a sectional view of the safety joint of this invention in its connected position as normally used in a pipe.

Figure 3 is a view, partly in elevation and partly in section, illustrating the safety joint of this invention in its disconnected position.

Figure 4 is a horizontal sectional view taken on line 4—4 of Figure 2.

Figure 5 is a horizontal sectional view taken on line 5—5 of Figure 3.

Figure 6 is a sectional view taken on line 6—6 of Figure 3 to illustrate one portion of the safety joint of this invention.

In the drawings, the letter S designates generally the safety joint of this invention which is adapted to be connected in, and form a part of, a casing, tubing or other pipe string P, whereby the upper portion of the pipe P can be released from the lower part of the pipe P in the event that the lower portion of the pipe P becomes stuck in a well bore or similar hole. As will be explained in detail, the safety joint S is so constructed that it has substantially the same internal diameter or bore as the rest of the pipe P so that under normal circumstances, with the safety joint S connected, the safety joint does not interfere with the movement of well tools therethrough. Also, the safety joint has substantially the same external diameter as the rest of the pipe P so that wash pipe and fishing tools of known constructions can pass around the safety joint S in the same manner as they pass around the pipe P. The safety joint S is adapted to be released by a rotation of a portion thereof and therefore the longitudinal movement of well tools through the safety joint S cannot inadvertently release the joint. For effecting the release of the safety joint S, an actuating or release device A (Figure 1) of any suitable type for imparting rotary or turning movement to the safety joint S to rotate same is provided. Such actuating or release tool A is adapted to be lowered into the well pipe P on a wire line or other support F and is adapted to be operated by the manipulation of the wire line or other support from the surface of the well to effect the turning movement for the release of the safety joint S, when desired.

The details of the preferred embodiment of the safety joint S of this invention are best shown in Figures 2–6, wherein the safety joint S is shown in its connected position (Figure 2) and in its disconnected position (Figure 3). The safety joint S has a lower tubular member 10 which has external threads 10a formed on its lower end for threaded engagement with internal threads 12a on the upper end 12 of the lower section or portion of the pipe P, whereby the lower tubular member 10 is connected to the lower section or portion of the pipe P with a usual type of tool joint. Above the lower tubular member 10, an upper tubular member 14 is connected to the upper portion or section of the pipe P with a similar type of tool joint 15 to that referred to above in connection with the lower tubular member 10. The lower member 10 and the upper member 14 are axially aligned with each other and, it will be noted, that the external diameter of each of such members is the same, or substantially the same, as the rest of the pipe or tubing P so that the safety joint S of this invention does not interfere with the lowering of a wash pipe or other well tools around the tubing or pipe P for fishing operations or similar well operations.

The lower tubular member 10 has arcuate lugs or projections 16 formed at its upper end, with spaces 17 therebetween. In the usual case there will be three lugs 16 and three of the spaces 17 therebetween. The upper tubular member 14 is provided with lugs 18 which are similar to the lugs 16 on the lower member 10. The lugs 18 are arcuate in construction and are also circumferentially spaced so that such lugs 18 are adapted to extend into the spaces 17 between the lugs 16, while at the same time the lugs 16 are adapted to extend into the spaces 19 between the lugs 18 (Figure 1). Thus, there are the same number of lugs 18 as there are lugs 16 so that the interfitting or interengagement of such lugs occurs when the safety joint S of this invention is in its connected position (Figures 1 and 2). A fluid seal formed by a plurality of sections 20, which are formed of rubber or a similar elastic sealing material, are disposed on the upper ends of the lugs 16 and the lower ends of the lugs 18. If such seal sections 20 are used, they can be formed initially by positioning an elastic seal on the upper ends of the lugs 16 and then moving the upper tubular member 14 towards the lower tubular member 10 so as to move the lugs 18 into the spaces 17 whereupon the seal ring is cut into the sections 20 illustrated in the drawings. It should be noted, however, that such seal provided by the seal sections 20 is not essential and therefore may be omitted, if desired.

A coupling sleeve 25 is disposed within the bores of the lower tubular member 10 and the upper tubular member 14 for connecting the members 10 and 14 for normally preventing the separation or relative longitudinal movement of the members 10 and 14 away from each other. The internal bore 25a of the coupling sleeve 25 is of the same internal diameter as the internal diameter of the pipe P so as not to interfere with the lowering of well tools through the pipe P when the safety joint S is connected. The coupling sleeve 25 has a plurality of arcuate circumferentially spaced lugs 26 which are all arranged in the same lateral plane and which have spaces 27 therebetween. Ordinarily, there are three lugs 26 and three spaces 27 therebetween.

The lower tubular member 10 is provided with an upper set of arcuate circumferentially spaced lugs 29 which have spaces 30 therebetween, and a lower set of arcuate circumferentially spaced lugs 32 which have spaces 33 therebetween. The lugs 29 and 32 extend inwardly and are aligned longitudinally with respect to each other (Figures 2 and 3). Although the number of the lugs 29 and 32 can vary, ordinarily there will be an equal number of the lugs 29 and 32 and as illustrated in the drawings, there are three lugs 29 and three lugs 32. The vertical or longitudinal distance between the lugs 29 and 32 is the same, or slightly greater than, the vertical height of the lugs 26 so that the lugs 26 are adapted to fit between the lugs 29 and 32 when the sleeve 25 is connected to the lower tubular member 10 (Figure 2). It should also be noted that the arcuate width of the spaces 30 between the lugs 29 is the same as, or slightly greater than, the width of the lugs 26 so that when the lugs 26 are longitudinally or vertically aligned with such spaces 30, the sleeve 25 can be raised upwardly or away from the lower tubular member 10. Ordinarily, the spaces 33 are of the same width as the spaces 30, as illustrated in the drawings, but it will be evident that such spaces 33 need not be provided since the releasing of the sleeve 25 from the lower tubular member 10 does not require any movement of the lugs 26 into the lug spaces 33. Thus, in some instances the lugs 32 may be formed in an annular ring.

In order to connect the coupling sleeve 25 to the upper tubular member 14 when the safety joint S is in its normal connected position (Figure 2), the sleeve 25 is formed with another set of arcuate circumferentially spaced lugs 35 which have spaces 36 therebetween. The lugs 35 are in the same lateral plane and each of the lugs 35 projects outwardly from the external surface of the coupling sleeve 25. The interior of the upper tubular member 14 is formed with lugs 38 which are also arcuate in shape and are circumferentially spaced (Figures 3 and 5). The number of the lugs 35 and 38 may vary, but in the usual case, there will be the same number of lugs 35 and 38 as the number of lugs 26 and 29, and as illustrated in the drawings, there are three of each of the lugs 35 and 38. An annular groove 40 is provided above the lugs 38 of the same longitudinal height or vertical distance as, or slightly greater than, the vertical height or longitudinal length of the lugs 35 so that the lugs 35 are adapted to be positioned within the space 40 and above the lugs 38 when the safety joint S is connected (Figure 2). The lugs 38 are, of course, spaced circumferentially from each other by the spaces 39 therebetween (Figure 5) which spaces 39 are of the same arcuate width as the arcuate width of the lugs 35 so that the lugs 35 can pass longitudinally downwardly through the spaces 39 upon the alignment of the lugs 35 with such spaces 39.

As mentioned, during the normal use of the safety joint S when it is in its connected position (Figure 2), the lugs 35 are positioned directly above the lugs 38 so as to prevent any relative longitudinal movement of the sleeve 25 with respect to the tubular member 14. Since the lugs 26 are disposed directly below the lugs 29, the coupling sleeve 25 is therefore also connected to the lower tubular member 10, whereby the tubular members 10 and 14 are connected together and are held against longitudinal relative movement. A shear pin 42 extends from the tubular member 14 into the sleeve 25 when the safety joint S is in its normal connected position with the lugs 35 above the lugs 38 so as to be positive that there is no inadvertent shifting of the sleeve 25 relative to the member 14. Since the longitudinally extending lugs 16 and 18 are interengaged, the shear pin 42, by holding the member 14 and the sleeve 25 fixed relative to each other, also holds the member 10 fixed relative to the sleeve 25.

One or more set screws or lock pins 43 are threaded into the upper tubular member 14 and extend into the bore thereof and into an annular groove 45 formed in the external surface of the coupling sleeve 25. The longitudinal height or vertical distance of the groove 45 is such that it permits only limited longitudinal movement of the sleeve 25 relative to the tubular member 14 when the lugs 35 are longitudinally aligned with the spaces 39 between the lugs 38 (Figure 5), the purpose of which will be more evident hereinafter.

To limit the turning of the sleeve 25 relative to the members 10 and 14 so as to stop such turning when the lugs 26 are vertically aligned with the spaces 30 and when the lugs 35 are vertically aligned with the spaces 39, a longitudinally extending stop bar or rod 48 is disposed between the ends 35a and 38a (Figures 3 and 5) of one of the lugs 35 and one of the lugs 38, respectively. Thus, the stop bar 48 is contacted by the end 35a and the end 38a when the sleeve 25 is turned counterclockwise (as viewed in Figure 5) so that further relative rotation of the sleeve 25 with respect to the upper tubular member 14 is prevented. A partially circumferential ring 49 is mounted on the sleeve 25 so that at the time the end 35a contacts the bar 48, the end 49a of the partial ring 49 also contacts the lower portion of the bar 48. Such ring 49 can, of course, be eliminated if the stop bar 48 is welded or otherwise secured to the external surface of the sleeve 25, but in the usual case, the bar 48 is not secured to either the sleeve 25 or to the tubular member 14 so that such ring 49 serves to apply a turning force to the lower end of the bar 48 for the stopping action of the sleeve 25 relative to the member 14. It will be noted that the stop bar 48 stops the movement of the sleeve 25 relative to the members 10 and 14 when the lugs 35 are aligned with the openings 39 between the lugs 38 and when the lugs 26 are aligned with the openings 30 between the lugs 29.

As previously mentioned, the sleeve 25 of the safety joint S of this invention is turned by a tool such as indicated by the letter A in Figure 1. As will be explained more in detail, such tool A is of the type which is adapted to impart a rotary force or impact by a manipulation of the wire line or flexible line supporting same. Such rotary force or impact is imparted to the coupling sleeve 25 through an actuating sleeve 50 which is disposed within the bore of the upper tubular member 14 and which has its own bore 50a which is of substantially the same diameter as the inner bore of the pipe P so as not to interfere with the lowering of well tools through the pipe P. In so far as the turning of the sleeve 25 is concerned, the actuating sleeve 50 could be integral with the sleeve 25, but in order to indicate to the operator at the surface of the well when the sleeve 25 has been turned to its released position, the sleeve 50 is made separately from the sleeve 25, as will be explained in detail hereinafter.

The actuating sleeve 50 is of special construction for receiving the latch arms 55 of the actuating tool A and for transmitting the rotary force or impacts from the tool A to the sleeve 25. To this end, the sleeve 50 is provided with diametrically opposed longitudinal slots 51 which are formed at their lower ends 51a with a width corresponding to the width of the latch arms 55. The thickness of the sleeve 50 adjacent the groove portion 51a is substantially less than the thickness of the rest of the sleeve 50 (Figure 1) so that when the latch arms 55 are in the grooves 51 and in contact with the surfaces 51a, such arms 55 are also engaged with the walls 51b of such groove portion 51a. The upper surface of the groove portion 51a is inclined inwardly and downwardly at 51c to guide the latch arms 55 into the groove portions 51a.

For guiding the arms 55 of the tool A into the longitudinal slots or grooves 51 and ultimately into the lower groove portion 51a of the sleeve 50, the sleeve 50 is formed with tapered or inclined walls 50a which lead from the longitudinal slots or grooves 51 upwardly and terminate in a point 50b at the upper end of the sleeve 50. Such points 50b are also diametrically opposed to each other and are at an angle of 90° with respect to the slots 51 so that regardless of the position of the latching arms as they are lowered downwardly for engagement with the actuating sleeve 50, such arms 55 are guided along the surfaces 50a into the longitudinal slots 51 and ultimately into the reduced thickness portions 51a at the lower ends of the slots 51.

The actuating sleeve 50 is prevented from moving upwardly relative to the upper tubular member 14 by the engagement of the shoulders 50c with the annular shoulder 14a inside of the member 14. The lower lateral edge 50d of the sleeve 50 rests upon the upper edge 25b of the sleeve 25 when the safety joint S is in its normal connected position (Figure 2). The upper end of the coupling sleeve 25 is formed with two diametrically opposed notches or recesses 52 which receive diametrically opposed downwardly extending projections 53 on the actuating sleeve 50. As best seen in Figure 2, the projections 53 are formed immediately below the longitudinal slots 51 so that the slot portion 51a at the lower end of each slot 51 continues into the projection 53 on each side of the coupling sleeve 50.

Each of the notches or recesses 52 has a lower lateral surface 52a upon which the lower lateral edge 53a of each projection 53 rests. The lateral surface 52a of each notch 52 projects inwardly beyond the lower notch portion 51a a sufficient distance so that the lower ends 55a of the latch arms 55 of the actuating tool A rests upon such lateral surfaces 52a to prevent the actuating tool A from falling relative to the safety joint S when the projections 53 are in the grooves or notches 52. The notches 52 are also formed with inclined cam walls 52b, and the projections 53 have similarly inclined walls or surfaces 53b which are in engagement when the projections 53 are in the notches 52. As will be explained upon a rotation of the actuating sleeve 50 relative to the coupling sleeve 25, one of the surfaces 53b on each of the projections 53 coacts with one of the inclined surfaces or walls 52b of each of the notches 52 so that the coupling 25 is forced downwardly as the lower end 53a of each projection 53 rides upwardly onto the upper lateral edge 25b of the coupling sleeve 25 (Figure 3).

As previously mentioned, the latch arms 55 have a portion of their lower surfaces or edges 55a in contact with the lateral or bottom wall or surface 52a of the notches 52 to prevent the latch arms 55 from moving downwardly beyond the upper end of the coupling sleeve 25 during the normal rotation of the sleeve 25. However, when the coupling sleeve 25 is stopped in its rotation, as will be explained, by reason of the stop bar 48, the continued rotation of the sleeve 50 moves it to the position shown in Figure 3 wherein the projections 53 are displaced to one side of the notches 52. When such relative movement of the actuating sleeve 50 with respect to the coupling sleeve 25 occurs, the lower slot portion 51a is then disposed above an inner downwardly and inwardly inclined surface 25c which extends from the upper edge 25b of the coupling sleeve 25 (Figure 2). Thus, the longitudinal slots 51 and their lower recessed portions 51a are positioned above the downwardly and inwardly inclined surface 25c so that the latch arms 55 are likewise positioned above such inclined surfaces 25c. With the weight of the actuating tool A imposed on the latch arms 55, they are caused to drop and are urged inwardly as they ride downwardly along the inclined surfaces 25c (Figure 6) so that the full weight of the tool A is then imposed upon the flexible line or wire line from which the tool A is suspended to thereby indicate to the operator at the surface of the well that the tool has dropped below the actuating sleeve 50 and is no longer connected thereto.

It should be noted that for protecting the lugs 26, 29 and 30 against the corrosive action of the fluid in the well, seal rings 60 and 61 are carried by the lower tubular member 10 and the coupling sleeve 25, respectively, in order to seal below and above the lugs 26, 29 and 30. Similarly, seals 62 and 63 are carried by the coupling sleeve 25 and the upper tubular member 14, respectively, to prevent fluid from entering in the area of the lugs 38 and 35. All of such seal rings are of the type known as "O-rings" which are formed of rubber or a similar elastic sealing material.

For actuating the safety joint S of this invention to release same, the actuating tool A is employed, as previously mentioned. Various types of actuating tools can be employed, such as described in the above-identified U.S. patent application, Serial No. 473,274, but ordinarily the type of tool identified by the letter A in Figure 1 of the drawings is used in actuating the safety joint S of this invention to release same. Such device A is provided with a central rod 70 which is positioned within a sleeve 71 so that the rod 70 and the sleeve 71 are longitudinally movable relative to each other, with such longitudinal relative movement being controlled by the movement of a pin 72 which extends outwardly from the rod 70 into a shaped guide slot 73 in the sleeve 71. The lower portion 73a of the slot 73 is preferably vertical or substantially vertical and the slot 73 gradually increases in inclination as it progresses upwardly so that the upper portion 73b of the slot 73 is substantially lateral or horizontal. Such construction of the slot 73 results in the rotational movement of the sleeve 71 relative to the rod 70 as the sleeve 71 is permitted to fall by gravity from an extended position to the fully telescoped position shown in Figure 1. Thus, the sleeve 71 would be in the fully extended position when the pin 72 is at the lower end of the slot 73 and it is in the fully collapsed or telescoped position (Figure 1) when the pin 72 is at or near the upper end of the slot 73. It should be noted that although the lower portion 73a of the slot 73 is illustrated as vertical, it is generally preferable to provide such lower portion 73a with a slight incline from vertical so that there is no sharp change in the movement of the pin 72 in the slot 73 as the sleeve 71 is dropped. The lower end of the rod 70 is threaded or otherwise suitably secured to a body 74 and such rod 70 is preferably prevented from rotating relative to the body 74 by a retaining set screw 75. The body 74 has at its upper end one or more substantially vertical or longitudinal anvil surfaces 74a which are adapted to be contacted by corresponding substantially vertical or longitudinal hammer surfaces 71a on the lower end of the sleeve 71. The hammer surface or surfaces 71a are adapted to contact the anvil surface or surfaces 74a when the sleeve 71 reaches its lower limit of travel to impart the rotary movement of the sleeve 71 to the body 74 with a rotary jarring impact. Ordinarily such surfaces 71a and 74a are slightly inclined with respect to vertical, as indicated in the drawings, but for practical purposes they may be described as being substantially vertical or longitudinal.

The body 74 is formed with the longitudinal slot or opening 74b therethrough for the reception of the pair of latching arms 55 which are pivoted or hinged together at pivot pin 76. The latching arms 55 are constantly urged laterally or radially outwardly into engagement with the inner surface of the well pipe P by a spring 77 or other equivalent resilient means. If desired, the latching arms 55 may be retained or locked by any suitable mechanism during the lowering thereof into the pipe P for the actuation of the safety joint S. For example, such a locking mechanism is disclosed in the copending U.S. patent application of Myron M. Kinley, Serial No. 436,647. Although the actuating tool A is ordinarily suspended in the well pipe P by a wire line or other flexible support which is connected to the sleeve 71 and which extends from the surface of the well, it will be evident that the invention hereof is not limited to the use of a wire line operated tool, but because of the numerous advantages and conveniences in connection with the use of a wire line actuated tool, such is ordinarily used.

In the operation or use of the safety joint S of this invention, the safety joint S is positioned in the pipe P at any desired point and normally would remain in the locked or connected position shown in Figure 2, wherein the safety joint is locked or connected so that the portions of the pipe P above and below the safety joint S remain firmly connected. In the event that the pipe becomes stuck in a well bore or hole, or for some other reason it becomes desirable to disconnect the portions of the pipe P which are joined by the safety joint S, then the actuating tool A is lowered through the pipe P until the latching arms 55 on the actuating tool A engage the guide or cam surfaces 50a of the actuating sleeve 50. Continued lowering of the actuating tool A causes the arms 55 to be guided along the surfaces 50a into the longitudinal slots 51 and ultimately into the lower slot portions 51a, with the lower ends 55a of the arms 55 resting upon the horizontal or bottom surfaces 52a of the notches 52 in the coupling 25 (Figure 1).

The actuating tool A is then actuated by raising the sleeve 71 upwardly relative to the rod 70 until the pin 72 is at the lower portion of the slot 73. Then the sleeve 71 is permitted to fall by gravity relative to the rod 70 and the sleeve 71 is guided in a rotational direction by the coaction between the pin 72 and the shaped guide slot 73 so that when the hammer surfaces 71a contact the anvil surfaces 74a, a rotary jarring impact is imparted to the body 74 and to the latch arms 55. Such impact is imparted to the actuating sleeve 50, and since the projections 53 are within the notches 52, the coupling sleeve 25 is also rotated. The initial rotational force imparted to the coupling 25 shears the pin 42 and thereafter the lugs 26 are moved or turned relative to the lugs 29 and 32. Also, the lugs 35 are moved or turned relative to the lugs 38. Such actuation of the actuating tool A is continued in the same fashion by raising and lowering the sleeve 71 through a manipulation of the wire line or other support connected thereto until the movement of the sleeve 25 is stopped by the engagement of the ends 35a and 49a with one side of the stop bar 48 while the other side of the stop bar is in contact with the end 38a of one of the lugs 38. Such stopping of the rotation of the coupling sleeve 25 relative to the upper and lower tubular members 10 and 14 occurs when the lugs 26 are longitudinally aligned with the spaces between the lugs 29 and when the lugs 35 are longitudinally aligned with the spaces 39 between the lugs 38. It will be noted that the longitudinally extending lugs or fingers 16 and 18 are at all times interengaged so that there is no rotation of either of the members 10 and 14, assuming the lower portion of the pipe P is stuck and held against movement.

In order to indicate to the operator at the surface of the well that the lugs 26 have been aligned with the spaces 30 for permitting a separation of the coupling sleeve 25 from the lower tubular member 10, the device is so constructed that continued rotation releases the engagement of the actuating tool with the actuating sleeve 50 to indicate to the operator that such has occurred by the increased weight on the wire line or other support for the tool A. Such indication occurs because even after the coupling sleeve 25 has been stopped in its rotation relative to the tubular members 10 and 14 by the stop bar 48, it is still possible to rotate the actuating sleeve 50. The turning or rotation of the sleeve 50 thus causes one of the surfaces 53b on each of the projections 53 to ride or move upwardly along one of the inclined surfaces 52b of the groove 52. Since the coupling sleeve 50 cannot move upwardly due to the shoulder 50c thereof which engages the internal shoulder 14a in the member 14, the coaction between the cam surfaces 53b and 52b forces the coupling sleeve 25 downwardly. Since the lugs 35 are aligned with the spaces 39 between the lugs 38, the downward movement of the coupling sleeve 25 relative to the tubular member 14 can occur. The extent of the downward movement is, however, limited by the engagement of the pin or pins 43 with the upper edge of the groove 45 in the coupling sleeve 25, but the downward movement is sufficient to permit the lower edges or surfaces 53a of the projections 53 to move upwardly and on top of the upper edge 25b of the coupling sleeve 25.

When the actuating sleeve 50 has thus moved relative to the coupling sleeve 25 to position the projections 53 to one side of the notches 52 and above the inner downwardly and inwardly inclined surfaces 25c of the coupling sleeve 25 (Figure 6), then the weight of the tool A causes same to be urged downwardly and the cam or inclined surfaces 25c force the arms 55 inwardly to permit the arms 55 to thereafter slide through the bore of the sleeve 25. When such occurs, the full weight of the tool A is then supported by the flexible line from which the tool A is suspended. The increased weight on the supporting line is an indication to the operator at the surface of the well that the actuating tool A has dropped through the safety joint and therefore the safety joint S is in a position for separating the coupling member 25 from the lower tubular member 10. Such separation can then be effected by simply raising the upper portion of the pipe P to cause the lugs 26 to move through the circumferential spaces 30 between the lugs 29. The lower portion of the pipe P with which the lower tubular member 10 is connected can then, of course, be retrieved by conventional fishing tools.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a safety joint for pipe, a first tubular member joined to one section of the pipe, a second tubular member joined to another section of the pipe, each of said tubular members having substantially the same external diameter as said pipe, a tubular connector means disposed in the bores of said tubular members for connecting said first and second tubular members, coacting means on the external surface of said connector means and on the internal surface of said first tubular member for preventing longitudinal movement therebetween, additional coacting means on the external surface of said connector means and on the internal surface of said second tubular member for preventing longitudinal movement therebetween, said tubular connector means having a bore throughout its entire length of substantially the same internal diameter as the internal diameter of said pipe, interengaging means on said first and second tubular members for maintaining said first tubular member and said second tubular member connected during rotation of the pipe in either direction, and means for rotating said connector means relative to one of said tubular members to disconnect same for thereafter separating said sections of pipe.

2. In a safety joint for pipe, a first tubular member joined to one section of the pipe, a second tubular member joined to another section of the pipe, connector means disposed in the bores of said tubular members for connecting said first and second members, coacting means on the external surface of said connector means and on the internal surface of said first tubular member for preventing longitudinal movement therebetween, additional coacting means on the external surface of said connector means and on the internal surface of said second tubular member for preventing longitudinal movement therebetween, actuating means supported by a flexible line and operable by a manipulation thereof for rotating said connector means relative to one of said members to disconnect same for thereafter separating said sections of pipe, and means for guiding said actuating means through the bore of said connector means after same has been rotated to the release position for thereby imposing the weight of said actuating means on said flexible line to indicate to the operator at the surface of the well that the safety joint is in the release position.

3. In a safety joint for pipe, a first tubular member joined to one section of the pipe, a second tubular member joined to another section of the pipe, a tubular connector means disposed in the bores of said tubular members for connecting said first and second tubular members, coacting means on the external surface of said connector means and on the internal surface of said first tubular member for preventing longitudinal movement therebetween, additional coacting means on the external surface of said connector means and on the internal surface of said second tubular member for preventing longitudinal movement therebetween, said tubular connector means having a bore of substantially the same internal diameter as the internal diameter of said pipe, interengaging means on said first and second tubular members for maintaining said first tubular member and said second tubular member connected during rotation of the pipe in either direction, means for rotating said connector means relative to one of said tubular members to disconnect same for thereafter separating said sections of pipe, and means for limiting the movement of said connector means during the release thereof to thereby prevent the movement of the connector means away from its position for releasing same.

4. In a safety joint for pipe, a first tubular member joined to one section of the pipe, a second tubular member joined to another section of the pipe, connector means disposed in the bores of said tubular members for connecting said first and second members, coacting means on the external surface of said connector means and on the internal surface of said first tubular member for preventing longitudinal movement therebetween, additional coacting means on the external surface of said connector means and on the internal surface of said second tubular member for preventing longitudinal movement therebetween, means supported by a flexible line and operable by a manipulation thereof for rotating said connector means relative to one of said members to disconnect same for thereafter separating said sections of pipe, and means for stopping the movement of said connector means during the release thereof to thereby prevent the rotation of the connector means away from its position for releasing same.

5. A safety joint for pipe, comprising a first member joined to one section of the pipe, a second member joined to another section of the pipe, a connector sleeve extending within and between said members, coacting means on the external surface of said sleeve and on the internal surface of said members connecting said sleeve to each of said members, the coacting means connecting said sleeve to one of said members being releasable upon a turning of said sleeve relative to both of said members whereby the members can be thereafter separated from each other, and means for maintaining said members connected during rotation of the pipe in either direction.

6. The structure set forth in claim 5, wherein the releasable connecting means connecting said sleeve to one of said members includes interengaging interrupted circumferential lugs on said sleeve and on said one of said members, said lugs being disengaged upon said turning of said sleeve a single partial revolution in one direction.

7. The structure set forth in claim 5, including an actuating sleeve operatively connected to said connector sleeve for rotation therewith, and an actuating means supported on and operable by the manipulation of a flexible line for imparting the turning movement to said actuating sleeve and thereby to said connector sleeve to release the coacting connection means on said connector sleeve from said one of said members.

8. The structure set forth in claim 5, including an actuating sleeve having releasable connecting means engageable with said connector sleeve for releasably connecting same for limited rotational movement together, and an actuating tool engageable with said actuating sleeve for imparting the turning movement to said actuator sleeve and thereby to said connector sleeve for effecting the release of said sleeve from said one of said members.

9. The structure set forth in claim 5, including a stop means associated with the other of said members for limiting the extent of turning of the connector sleeve relative to said pipe so as to stop such turning when the coacting means on said one of said members is in a position for releasing same.

10. A safety joint adapted to be disposed in a well pipe, including a lower tubular member connected to a lower section of the pipe, an upper tubular member connected to an upper section of the pipe, coacting means on said members for preventing rotational movement of said members relative to each other upon rotation of said pipe in either direction, a coupling sleeve disposed within said members, and coacting means on the external surface of said sleeve and the internal surface of said members for releasablp connecting said members together for preventing longitudinal separation thereof.

11. The safety joint set forth in claim 10, including an actuating member engageable with said coupling means for rotation therewith, said actuating member having means for receiving an actuating tool which is adapted to turn said actuating member for thereby turning said coupling means relative to said tubular members to release same therefrom, whereby said tubular members can be longiutdinally separated from each other.

12. The safety joint set forth in claim 10, wherein said coacting means on said members for preventing rotational movement of said members includes a plurality of interengaging interrupted circumferential lugs adapted to be released upon a single partial revolution of said sleeve in one direction.

13. The safety joint set forth in claim 10, including coacting circumferentially spaced lugs on said coupling sleeve and on the lower tubular member for engagement to prevent longitudinal movement of said lower tubular member relative to said coupling sleeve, and said sleeve being rotatable to position the lugs on said sleeve in longitudinal alignment with spaces between the lugs on said lower tubular member upon a single partial revolution of said sleeve in one direction to thereby enable the longitudinal release of the coupling sleeve from the lower tubular member.

14. In combination with an actuating tool adapted to be suspended from a support extending to the surface of the well, a well pipe, a safety joint connected in the well pipe and having a lower tubular member connected to a lower section of the well pipe, an upper tubular member connected to an upper section of the well pipe, coacting means on said members for preventing rotational movement of said members relative to each other, a coupling means disposed within said members releasably connecting said members together for preventing longitudinal separation thereof, and means in said well pipe for releasably connecting said actuating tool to said coupling means for effecting a release thereof from one of said members upon a longitudinal manipulation of said support whereby the members can be thereafter separated from each other.

15. A safety joint adapted to be disposed in a well pipe, including a lower tubular member connected to a lower section of the pipe, an upper tubular member connected to an upper section of the pipe, coacting means on said members for preventing rotational movement of said members relative to each other, a coupling means disposed within said members releasably connecting said members together for preventing longitudinal separation thereof, said coupling means including a coupling sleeve, coacting circumferentially spaced lugs on said coupling sleeve and on the lower tubular member for engagement to prevent longitudinal separation of said lower tubular member relative to said coupling sleeve, said sleeve being rotatable to position the lugs of said sleeve in longitudinal alignment with the spaces between the lugs on said lower tubular member to thereby enable the longitudinal release of the coupling sleeve from the lower tubular member, and other coacting circumferentially spaced lugs on said coupling sleeve and on said upper tubular member, and a stop bar disposed between the ends of one of the lugs on said sleeve and one of the lugs on said upper tubular member for contact by said ends upon said alignment of the lugs on the sleeve with the spaces between the lugs on the lower tubular member, whereby the turning movement of the coupling sleeve is stopped when the sleeve is in position for separation from the lower tubular member.

16. In combination with an actuating tool adapted to be suspended from a support extending to the surface of the well, a well pipe, a safety joint connected in the well pipe and having a lower tubular member connected to a lower section of the well pipe, an upper tubular member connected to an upper section of the well pipe, coacting means on said members for preventing rotational movement of said members relative to each other, a coupling means disposed within said members releasably connecting said members together for preventing longitudinal separation thereof, means for releasably connecting said actuating tool to said coupling means for effecting a release thereof from one of said members upon a manipulation of said support whereby the members can be thereafter separated from each other, and means for automatically releasing the actuating tool from its connection with said coupling means when the coupling means has been released from said one of said members to indicate such release to the operator of the actuating tool at the surface of the well.

17. In combination with an actuating tool adapted to be suspended from a support extending to the surface of the well, a well pipe, a safety joint connected in the well pipe and having a lower tubular member connected to a lower section of the well pipe, an upper tubular member connected to an upper section of the well pipe, coacting means on said members for preventing rotational movement of said members relative to each other, a coupling means disposed within said members releasably connecting said members together for preventing longitudinal separation thereof, means for releasably connecting said actuating tool to said coupling means for effecting a release thereof from one of said members upon a manipulation of said support whereby the members can be thereafter separated from each other, and said means for releasably connecting said actuating tool to said coupling means including a sleeve having a projection thereon extending into a recess in said coupling means for normally transmitting rotary movement of said sleeve to said coupling means.

18. In combination with an actuating tool adapted to be suspended from a support extending to the surface of the well, a well pipe, a safety joint connected in the well pipe and having a lower tubular member connected to a lower section of the well pipe, an upper tubular member connected to an upper section of the well pipe, coacting means on said members for preventing rotational movement of said members relative to each other, a coupling means disposed within said members releasably connecting said members together for preventing longitudinal separation thereof, means for releasably connecting said actuating tool to said coupling means for effecting a release thereof from one of said members upon a manipulation of said support whereby the members can be thereafter separated from each other, said coupling means including a coupling sleeve having a recess in its upper end, said means for releasably connecting said actuating tool to said coupling means including an actuating sleeve rotatable by said actuating tool and having a projection on its lower end for fitting into said recess in said coupling sleeve for transmitting the rotational movement of said actuating sleeve to said coupling sleeve for effecting the release thereof from one of said members, means for stopping the rotational movement of said coupling sleeve when the coupling sleeve is moved to its released position, said actuating sleeve being rotatable relative to said coupling sleeve after the rotation of the coupling sleeve is stopped, and cam means for releasing the actuating tool from said actuating sleeve after said actuating sleeve has moved a predetermined distance relative to said coupling sleeve to thereby impose the weight of the actuating tool on the support for indicating to the operator at the surface of the well that the safety joint is in a released position.

19. In a safety joint for pipe, a first tubular member joined to one section of the pipe, a second tubular member joined to another section of the pipe, connector means disposed in the bores of said tubular members for connecting said first and second members, coacting means on the external surface of said connector means and on the internal surface of said first tubular member for preventing longitudinal movement therebetween, additional coacting means on the external surface of said connector means and on the internal surface of said second tubular member for preventing longitudinal movement therebetween, means for maintaining said first and second members connected during rotation of the pipe in either direction, and means separate from said connector means for rotating said connector means relative to both of said members for releasing said connector means from said one of said members to disconnect same for thereafter permitting a separation of said sections of pipe upon a longitudinal movement of said one of said members relative to said connector means.

References Cited in the file of this patent

UNITED STATES PATENTS

| | | |
|---|---|---|
| 2,049,289 | Burns et al. | July 28, 1936 |
| 2,259,191 | Allan | Oct. 14, 1941 |
| 2,387,682 | Richey | Oct. 23, 1945 |
| 2,463,353 | Brown et al. | Mar. 1, 1949 |
| 2,532,686 | Ware | Dec. 5, 1950 |
| 2,562,298 | Creighton | July 31, 1951 |
| 2,670,927 | Edwards | Mar. 2, 1954 |
| 2,698,761 | Claypool et al. | Jan. 4, 1955 |

FOREIGN PATENTS

| | | |
|---|---|---|
| 162,690 | Austria | Mar. 25, 1949 |